(12) United States Patent
Temam et al.

(10) Patent No.: US 9,946,539 B1
(45) Date of Patent: Apr. 17, 2018

(54) ACCESSING DATA IN MULTI-DIMENSIONAL TENSORS USING ADDERS

(71) Applicant: Google LLC, Mountain View, CA (US)

(72) Inventors: Olivier Temam, Antony (FR); Harshit Khaitan, San Jose, CA (US); Ravi Narayanaswami, San Jose, CA (US); Dong Hyuk Woo, San Jose, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 15/603,061

(22) Filed: May 23, 2017

(51) Int. Cl.
G06F 9/302 (2006.01)
G06F 9/34 (2006.01)
G06F 9/30 (2018.01)
G06F 9/32 (2018.01)
G06F 17/16 (2006.01)

(52) U.S. Cl.
CPC ........ *G06F 9/3001* (2013.01); *G06F 9/30021* (2013.01); *G06F 9/30072* (2013.01); *G06F 9/34* (2013.01); *G06F 9/30065* (2013.01); *G06F 9/30101* (2013.01); *G06F 9/325* (2013.01); *G06F 17/16* (2013.01); *G06F 2212/454* (2013.01)

(58) Field of Classification Search
CPC ............... G06F 9/3001; G06F 9/30021; G06F 9/30054; G06F 9/30065; G06F 9/30058; G06F 9/30072; G06F 9/30101; G06F 9/34; G06F 9/355; G06F 9/325; G06F 17/16; G06F 2212/454

USPC ........... 712/221–224, 241; 717/160; 708/607
See application file for complete search history.

(56) References Cited

U.S. PATENT DOCUMENTS

| | | | |
|---|---|---|---|
| 5,617,512 A | 4/1997 | Pechanek et al. | |
| 5,958,048 A * | 9/1999 | Babaian | G06F 8/441 712/241 |
| 6,219,784 B1 | 4/2001 | Witt | |
| 6,507,835 B1 | 1/2003 | Amundsen et al. | |
| 8,443,169 B2 | 5/2013 | Pechanek | |
| 2004/0034754 A1* | 2/2004 | Schreiber | 711/165 |
| 2004/0187102 A1* | 9/2004 | Garthwaite | G06F 8/443 717/160 |
| 2010/0153100 A1* | 6/2010 | Kyung Jin | G10L 19/107 704/219 |

* cited by examiner

*Primary Examiner* — Daniel H Pan
(74) *Attorney, Agent, or Firm* — Fish & Richardson P.C.

(57) ABSTRACT

Methods, systems, and apparatus, including an apparatus for accessing a N-dimensional tensor, the apparatus including, for each dimension of the N-dimensional tensor, a partial address offset value element that stores a partial address offset value for the dimension based at least on an initial value for the dimension, a step value for the dimension, and a number of iterations of a loop for the dimension. The apparatus includes a hardware adder and a processor. The processor obtains an instruction to access a particular element of the N-dimensional tensor. The N-dimensional tensor has multiple elements arranged across each of the N dimensions, where N is an integer that is equal to or greater than one. The processor determines, using the partial address offset value elements and the hardware adder, an address of the particular element and outputs data indicating the determined address for accessing the particular element of the N-dimensional tensor.

20 Claims, 10 Drawing Sheets

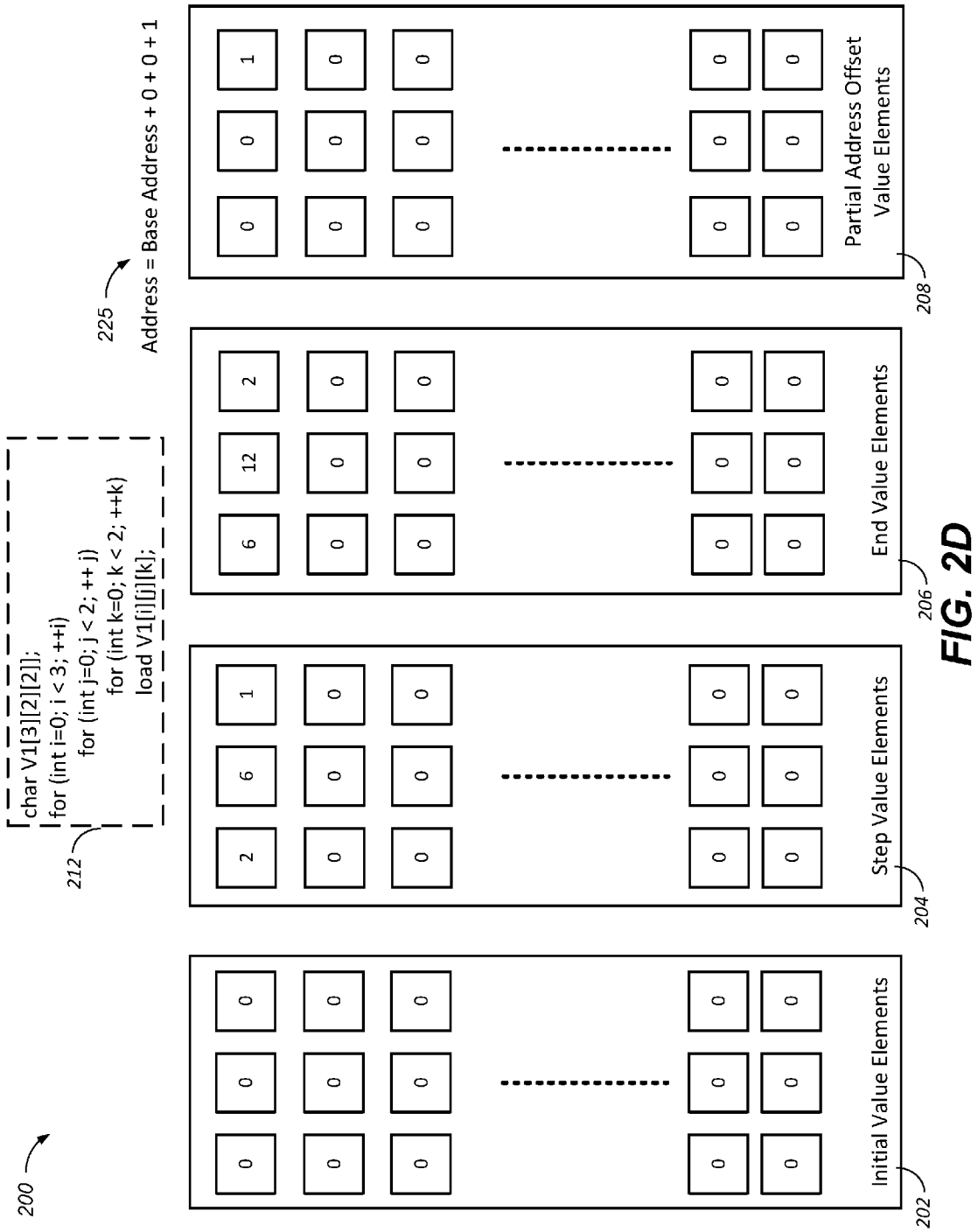

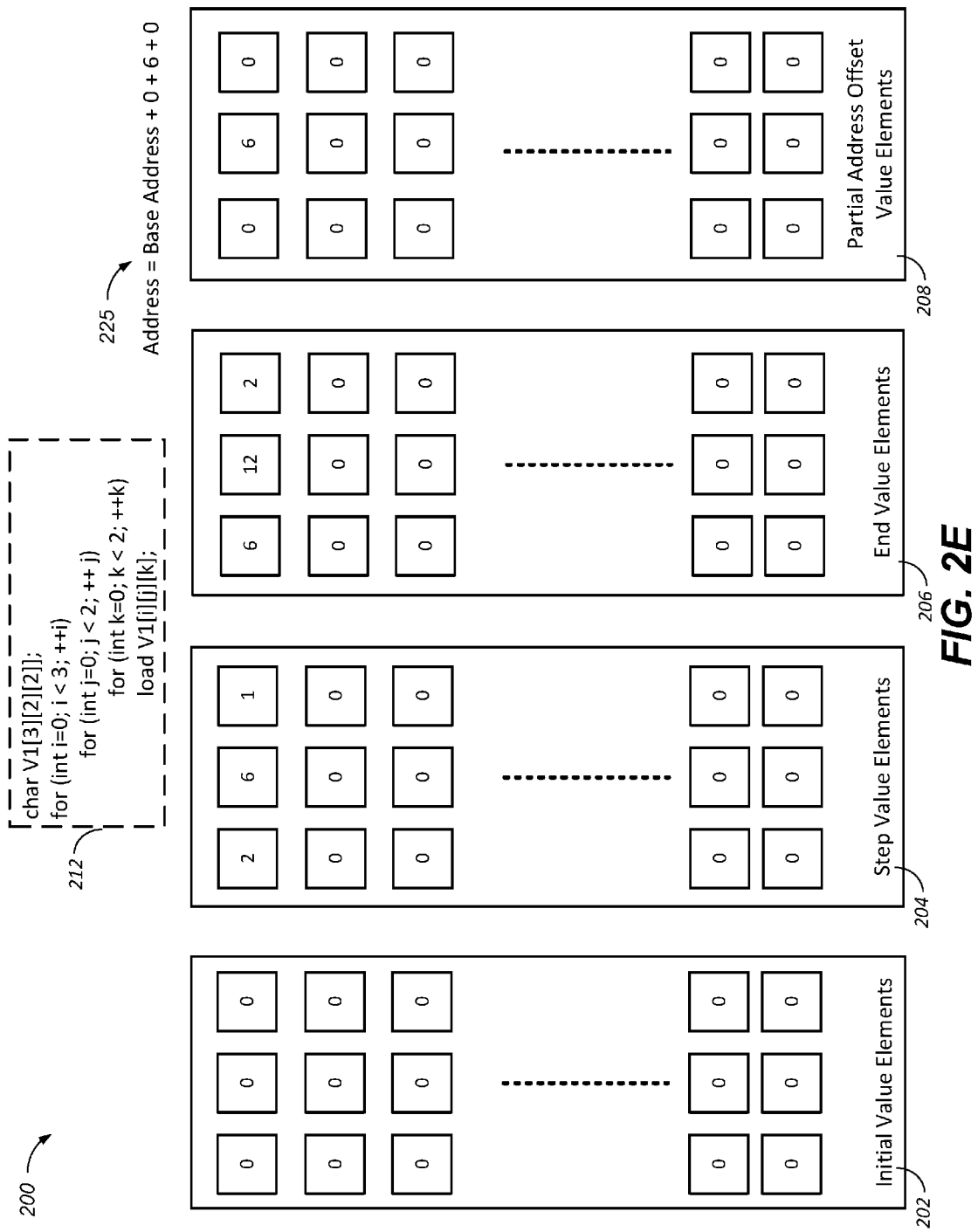

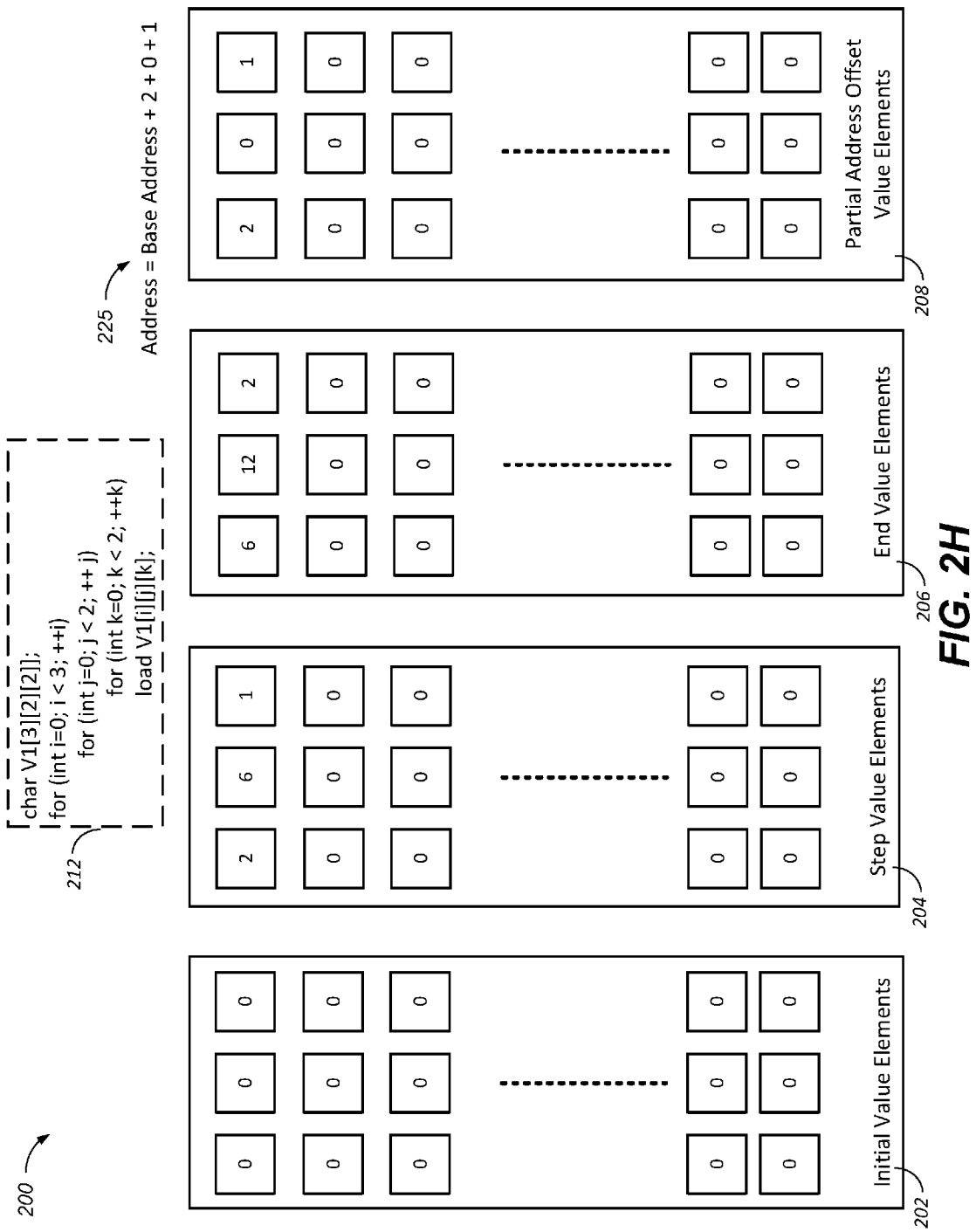

ACCESSING DATA IN MULTI-DIMENSIONAL TENSORS USING ADDERS

BACKGROUND

This specification generally relates to performing machine learning computations using a special purpose computational unit with hardware adders.

Neural networks are machine learning models that employ one or more layers of models to generate an output, e.g., a classification, for a received input. Some neural networks include one or more hidden layers in addition to an outer layer. The output of each hidden layer is used as input to the next layer in the network, i.e., the next hidden layer or the output layer of the network. Each layer of the network generates an output from a received input in accordance with current values of a respective set of parameters.

Some neural networks include one or more convolutional neural network layers. Each convolutional neural network layer has an associated set of kernels. Kernels can be represented as a matrix structure of weight inputs. Each convolutional layer uses the kernels to process inputs to the layer. A set of inputs to the layer can also be represented as a matrix structure.

SUMMARY

This specification describes technologies relating to accessing a N-dimensional tensor using one or more hardware adders for determining memory addresses of the tensor elements.

In general, one innovative aspect of the subject matter described in this specification can be embodied in an apparatus for accessing a N-dimensional tensor. The apparatus can include, for each dimension of the N-dimensional tensor, a partial address offset value element that stores a partial address offset value for the dimension based at least on an initial value for the dimension, a step value for the dimension, and a number of iterations of a loop for the dimension. The apparatus can also include one or more hardware adders and one or more processors. The one or more processors can be configured to obtain an instruction to access a particular element of the N-dimensional tensor. The N-dimensional tensor can have multiple elements arranged across each of the N dimensions. N can be an integer that is equal to or greater than one. The processor(s) can determine, using one or more of the partial address offset value elements and the one or more hardware adders, an address of the particular element and output data indicating the determined address for accessing the particular element of the N-dimensional tensor.

These and other implementations can each optionally include one or more of the following features. In some aspects, the apparatus can include, for each dimension an initial value element that stores the initial value for the dimension and a step value element that stores the step value for the dimension. Each partial address offset value element, each initial value element, and each step value element can include a register.

In some aspects, determining the address of the particular element can include determining a sum of the partial address offset values for each dimension using the one or more hardware adders. The one or more processors can be configured to determine, for each dimension, the partial address offset value for the dimension after each iteration of a nested loop for the dimension by adding the step value to a previous address offset value for the dimension.

The apparatus can include, for each dimension, a limit value element that stores a limit value for the dimension. The one or more processors can determine, for each dimension, whether the determined partial address offset value for a dimension equals the limit value for the dimension. In response to determining that the determined partial address offset value for a first dimension that corresponds to a first nested loop equals the limit value for the first dimension, the one or more processors can reset the partial address offset value for the first dimension to the initial value for the first dimension and update, for a second dimension that corresponds to a second nested loop in which the first nested loop is nested and using the one or more hardware adders, the partial address offset value for the second dimension to equal a sum of the step value for the second dimension and the partial address offset value for the second dimension. In some aspects, the step value for each dimension is a predetermined value based on a number of elements in one or more of the dimensions.

The subject matter described in this specification can be implemented in particular embodiments so as to realize one or more of the following advantages. Using registers to keep track of memory address values allows a program to iterate deeply-nested loops with one instruction. Memory address values can be quickly determined by applying simple additions based on the values stored in the registers. A special purpose computational unit can include adders that calculate the addresses. By using adders rather than arithmetic logic units (ALUs), multipliers, or other complex circuitry, the size of the circuit and fabrication costs of the circuit can be reduced. Determining memory address values using hardware adders allows the number of computational cycles at the processor to be reduced, and increases processor bandwidth for other computation tasks. Tensors can be traversed with a reduced number of instructions. A two-dimensional register architecture allows multi-dimensional tensors each having different dimensions to be tracked concurrently.

Other implementations of this and other aspects include corresponding systems, methods, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue of having instructions that, when executed by data processing apparatus, cause the apparatus to perform the actions.

The details of one or more implementations of the subject matter described in this specification are set forth in the accompanying drawings and the description below. Other potential features, aspects, and advantages of the subject matter will become apparent from the description, the drawings, and the claims.

BRIEF DESCRIPTION OF THE DRAWINGS

FIGS. 2A-2H illustrate an example tensor traversal unit.

Like reference numbers and designations in the various drawings indicate like elements.

DETAILED DESCRIPTION

Figure 1:
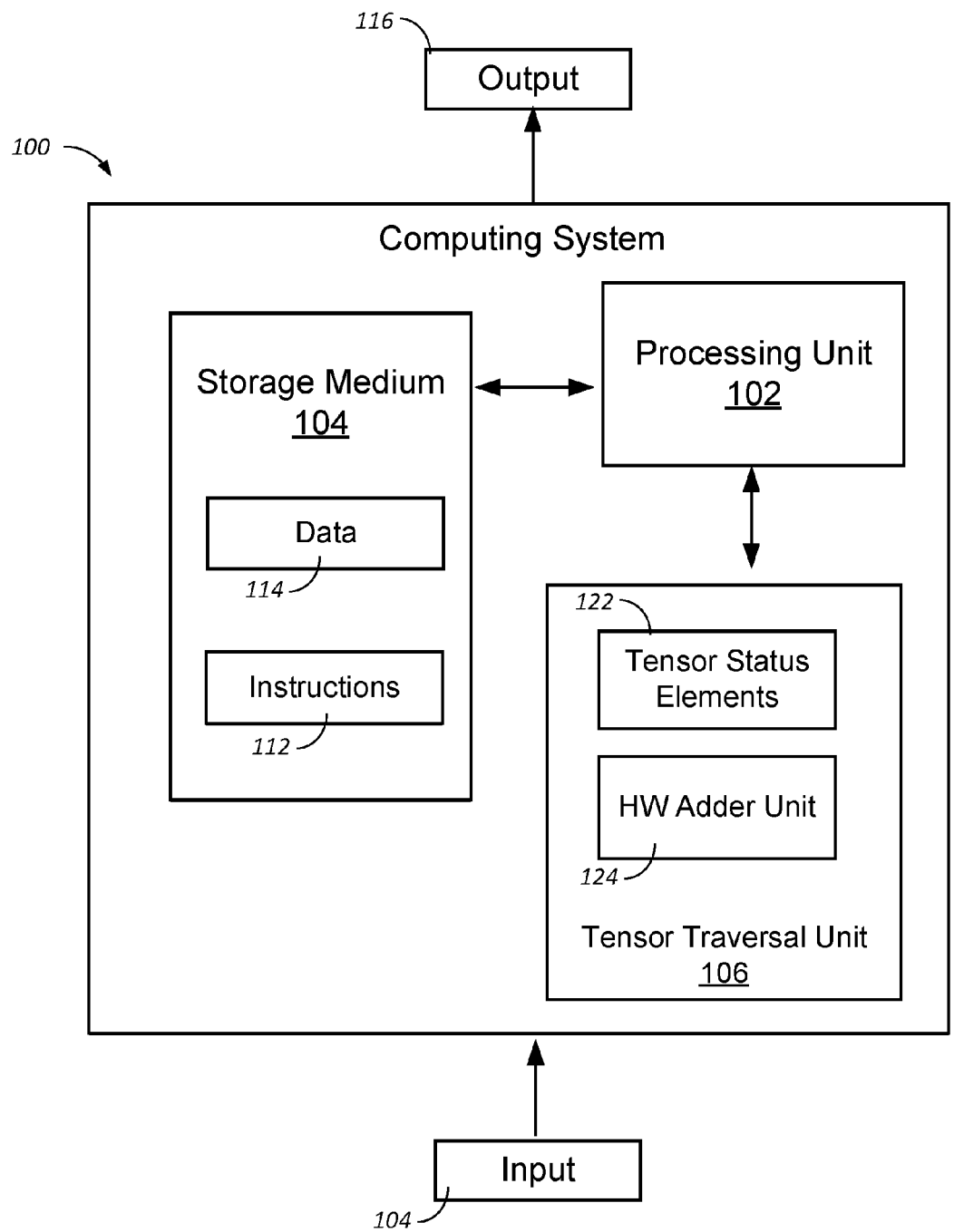
FIG. 1 is a block diagram of an example computation system.

In general, when a software algorithm processes a N-dimensional tensor, a nested loop may be used. Each loop can be responsible for traversing a respective dimension of the N-dimensional tensor. A multi-dimensional tensor may be a matrix or a multi-dimensional matrix. For example, a 2-dimensional tensor is a matrix, while a 3-dimensional tensor is a three-dimensional matrix made up of multiple two-dimensional matrices. Each dimension of the N-dimensional tensor may include one or more elements, where each element may store a respective data value. For example, a tensor may be a variable in a program, where the variable may have three dimensions. The first dimension may have a length of three hundred elements, the second dimension may have a length of a thousand elements, and the third dimension may have a length of twenty elements. Of course, other numbers of elements in each dimension are possible.

Traversing the tensor in a nested loop can include a computation of a memory address value of an element to load or store the corresponding data value of the element. A for-loop is an example of a nested loop, where three loops tracked by three loop index variables (e.g., i, j, and k) can be nested to traverse through a three-dimensional tensor. In a neural network, a value of an element may be used in one or more dot product computations associated with the tensor. For example, the value of the element may be multiplied with a corresponding parameter or weight. The elements of the tensor may be traversed in order using nested for-loops to access the element and perform one or more computations using the value of the element. Continuing the three dimensional tensor example, an outer for-loop may be used to traverse the loop tracked by variable i, a middle for-loop loop may be used to traverse the loop tracked by variable j, and an inner for-loop may be used to traverse the loop tracked by variable k. In this example, the first element accessed may be (i=0, j=0, k=0), the second element may be (i=0, j=0, k=1), and so on. As described below, a tensor traversal unit can be used to determine the memory address for each element in order using nested loops so that a processing unit can access the value of the element and perform the one or more computations using the value of the element. The values of weights or parameters can also be accessed similarly using nested for-loops. The tensor traversal unit can also be used to determine the addresses for weights or parameters used in the computations and/or for the outputs of the computations, which may be used as inputs to a hidden layer of the neural network.

In some cases, a processor may need to execute a loop bound condition, such as setting a loop bound of an inner loop with an outer loop index variable. For example, in determining whether to exit the inner-most loop of a nested loop, the program may compare the current value of the loop index variable of the inner-most loop with the current value of the loop index variable of the outer-most loop of the nested loop.

These tasks may require a significant number of instructions such as branch instructions and integer arithmetic instructions. When each loop bound is small and the number of loops is large, the computation may take a significant portion of the overall execution time, and seriously degrade overall performance. A hardware tensor traversal unit for a processor may increase the computation bandwidth of the processor by reducing the number of dimensions that the processor is required to process when traversing a tensor.

FIG. 1 shows a block diagram of an example computing system 100 for traversing a tensor. In general, the computing system 100 processes an input 104 to generate an output 116. The computing system 100 may be configured to perform linear algebra computations. The input 104 may be any suitable data that can be processed by the computing system 100. The computing system 100 includes a processing unit 102, a storage medium 104, and a tensor traversal unit 106.

In general, when the processing unit 102 executes an instruction for accessing a particular element of a tensor, the tensor traversal unit 106 determines the address of the particular element of the tensor, such that the processing unit 102 may access the storage medium 104 to read data 114 representing the value of the particular element. For example, a program may include a nested loop and the processing unit 102 may execute an instruction to access an element of a two-dimensional array variable within the nested loop according to current index variable values associated with the nested loop. Based on the current index variable values associated with the nested loop, the tensor traversal unit 106 may determine an address offset value that represents an offset from a memory address for a first element of the two-dimensional array variable. The processing unit 102 may then access, using the address offset value and from the storage medium, the particular element of the two-dimensional array variable.

The processing unit 102 is configured to process instructions for execution within the computing system 100, including instructions 112 stored in the storage medium 104 or other instructions stored in another storage device. The processing unit 102 may include one or more processors. The storage medium 104 stores information within the computing system 100. In some implementations, the storage medium 104 is a volatile memory unit or units. In some other implementations, the storage medium 104 is a non-volatile memory unit or units. The storage medium 104 may also be another form of computer-readable medium, such as a floppy disk device, a hard disk device, an optical disk device, or a tape device, a flash memory or other similar solid state memory device, or an array of devices, including devices in a storage area network or other configurations. The instructions, when executed by the processing unit 102, cause the processing unit 102 to perform one or more tasks.

The tensor traversal unit 106 may be implemented as an application-specific integrated circuit. The tensor traversal unit 106 may be configured to determine a status associated with one or more tensors. The status may include loop bound values, current loop index variable values, partial address offset values for determining a memory address value, and/or program counter values for handling branch loop bounds.

The tensor traversal unit 106 translates tensor indices into memory addresses. For example, the tensor traversal unit 106 may translate a set of N-dimensional tensor indices into a one-dimensional address space. The tensor traversal unit can perform such translations by making a tensor element's memory address a combination (e.g., a linear combination) of the element's dimension indices.

The tensor traversal unit 106 can efficiently and programmatically generate a sequence of addresses which reference a sequence of tensor elements. The address sequence corresponds to the sequence of tensor elements that would be accessed by a loop nest in a software traversal routine. The sequence of elements accessed during the traversal may or may not be physically contiguous in memory. The example illustrated in FIGS. 2B-2H and described below provide an example of how the sequence of elements are not physically contiguous in memory.

The tensor traversal unit 106 includes tensor address value elements 122 and a hardware adder unit 124. Each of the tensor address value elements 122 may be a storage element, for example a register or any other suitable storage circuitry. In some implementations, the tensor address value elements 122 may be physically or logically arranged into different groups, as described in more detail below with reference to FIGS. 2A-2H. In some implementations, a group of the tensor address value elements 122 may be physically or logically arranged into a multi-dimensional array. For example, each group of the tensor address value elements 122 may be physically or logically arranged into a two-dimensional array.

The hardware adder unit 124 can include one or more hardware adders. Each adder may include digital circuitry that is configured to perform addition operations. For example, as described below, the one or more adders may add partial address offset values to determine a total address offset value for an element of a tensor. As hardware adders require fewer circuit components than arithmetic logic units (ALUs) and hardware multipliers, the size of the circuitry of the hardware adder unit 124 (and thus the size of the tensor traversal unit 106) can be smaller than a tensor traversal unit that includes ALUs and/or multipliers. In addition, the cost of fabricating a tensor traversal unit with hardware adders may be less than the cost of fabricating a tensor traversal unit with ALUs and/or multipliers. In some implementations, the hardware adder unit 124 includes only adders and no other mathematical or logic circuitry.

Figure 2A:
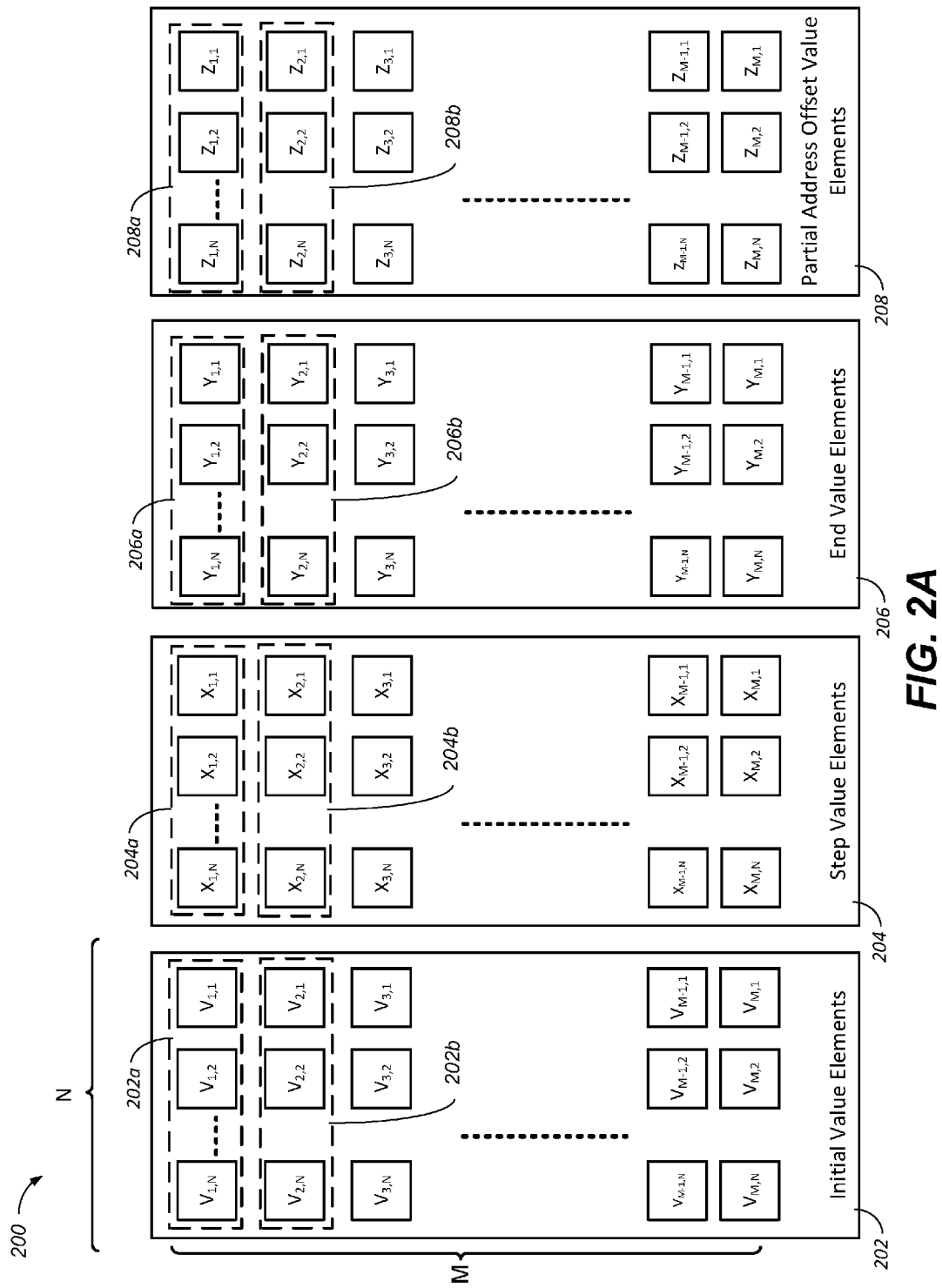

FIG. 2A shows an example set of tensor address value elements 200 of a tensor traversal unit. The tensor address value elements 200 may correspond to the tensor address value elements 122 of the tensor traversal unit 106. The tensor traversal unit 200 includes a group of initial value elements 202, a group of step value elements 204, a group of end value elements 206, and a group of partial address offset value elements 208.

The initial value elements 202 may be physically or logically arranged as a 2-D array having M rows and N columns, where M and N are integers greater than or equal to one. The initial value elements 202 may store initial values of partial address offsets used to determine a memory address for a tensor element. In some implementations, each row of the initial value elements 202 may represent initial values for a tensor. For example, if a program defines two array variables V1 and V2, the tensor traversal unit may assign rows 202a and 202b to store the initial values for array variables V1 and V2, respectively. In some implementations, each column of the initial value elements 202 may represent initial values for nested loop index variable values that are associated with a tensor. For example, if the program defines a nested loop having three loops for accessing the variable V1, where each loop of the nested loop is indexed by nested loop index variables i, j, and k, the tensor traversal unit may assign initial value elements $V_{1,1}$, $V_{1,2}$, and $V_{1,3}$ to store the initial value for the nested loop index variable i, j, and k, respectively. The initial value elements 202 are described in more detail below with reference to FIGS. 2B-2H.

The step value elements 204 may be physically or logically arranged as a 2-D array having the same dimensions as the initial value elements 202, where each element of the step value elements 204 has a corresponding element in the initial value elements 202. The step value elements 204 may store step values of partial address offsets used to determine a memory address for a tensor element. In some implementations, each row of the step value elements 204 may represent step values for a tensor. For example, if a program defines two array variables V1 and V2, the tensor traversal unit may assign rows 204a and 204b to store the step values for array variables V1 and V2, respectively. In some implementations, each column of the step value elements 204 may represent step values for nested loop index variable values that are associated with a tensor. For example, if the program defines a nested loop having three loops for accessing the variable V1, where each loop of the nested loop is indexed by nested loop index variables i, j, and k, the tensor traversal unit may assign step value elements $X_{1,1}$, $X_{1,2}$, and $X_{1,3}$ to store the step value for the nested loop index variable i, j, and k, respectively. The step value elements 204 are described in more detail below with reference to FIGS. 2B-2H.

The end value elements 206 may be physically or logically arranged as a 2-D array having the same dimensions as the initial value elements 202, where each element of the end value elements 206 has a corresponding element in the initial value elements 202. The end value elements 206 may store ends values of partial address offsets used to determine a memory address for a tensor element. In some implementations, each row of the end value elements 206 may represent end values for a tensor. For example, if a program defines two array variables V1 and V2, the tensor traversal unit may assign rows 206a and 206b to store the end values for array variables V1 and V2, respectively. In some implementations, each column of the end value elements 206 may represent end values for nested loop index variable values that are associated with a tensor. For example, if the program defines a nested loop having three loops for accessing the variable V1, where each loop of the nested loop is indexed by nested loop index variables i, j, and k, the tensor traversal unit may assign end value elements $Y_{1,1}$, $Y_{1,2}$, and $Y_{1,3}$ to store the end value for the nested loop index variable i, j, and k, respectively. The end value elements 206 are described in more detail below with reference to FIGS. 2B-2H.

The partial address offset value element 208 may be physically or logically arranged as a 2-D array having the same dimensions as the initial value elements 202, where each element of the partial address offset value elements 208 has a corresponding element in the initial value elements 202. The partial address offset value elements 206 may store partial address offset values used to determine a memory address for a tensor element. In some implementations, each row of the partial address offset value elements 208 may represent partial address offset values for a tensor. For example, if a program defines two array variables V1 and V2, the tensor traversal unit may assign rows 208a and 208b to store the partial address offset values for array variables V1 and V2, respectively. In some implementations, each column of the partial address offset value elements 208 may represent partial address offset values for nested loop index variable values that are associated with a tensor. For example, if the program defines a nested loop having three loops for accessing the variable V1, where each loop of the nested loop is indexed by nested loop index variables i, j, and k, the tensor traversal unit may assign partial address offset value elements $Z_{1,1}$, $Z_{1,2}$, and $Z_{1,3}$ to store the partial address offset value for the nested loop index variable i, j, and k, respectively. The partial address offset value elements 208 are described in more detail below with reference to FIGS. 2B-2H.

Figure 2B:
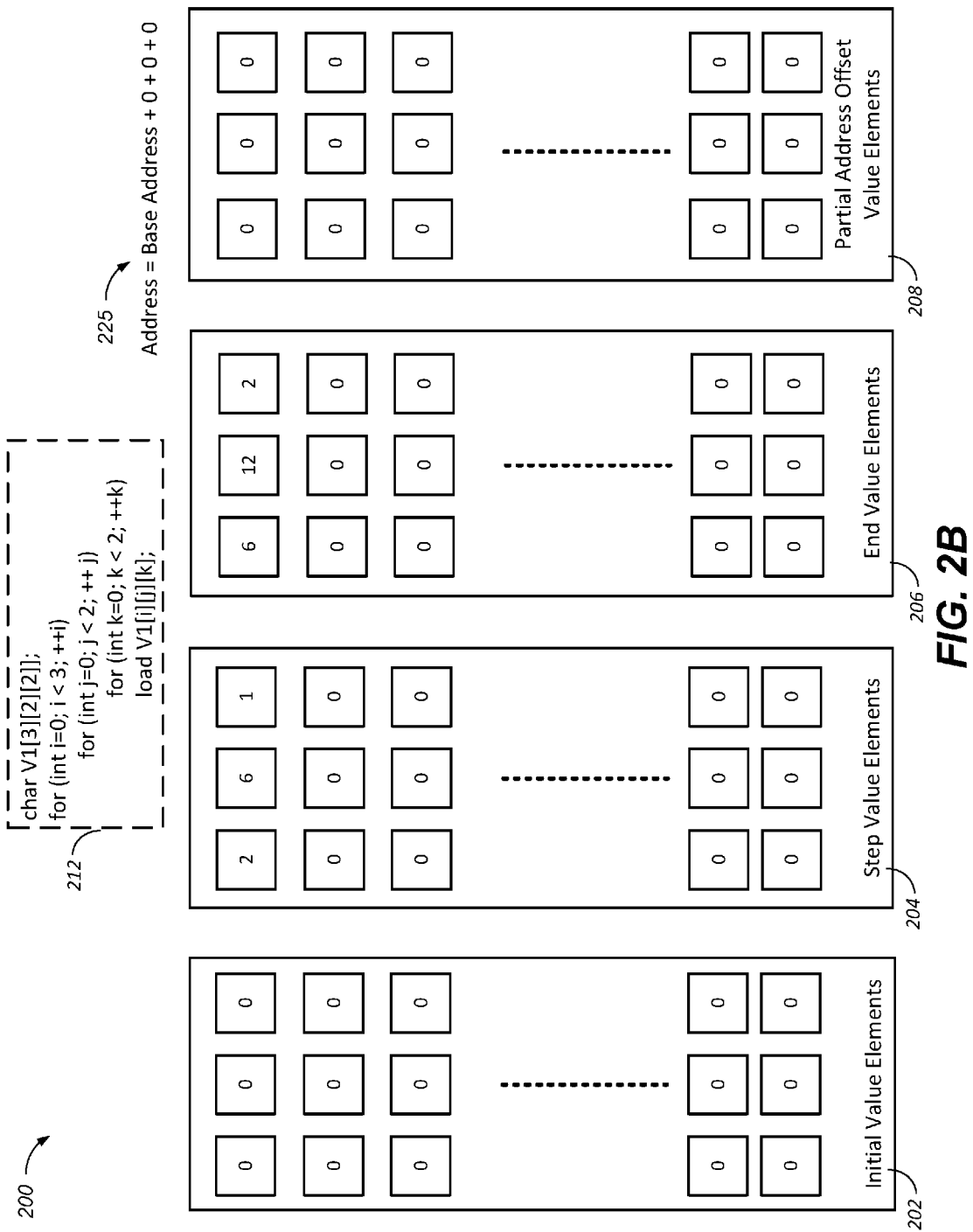

FIGS. 2B-2H show an example of how the tensor address value elements 200 may be used by a tensor traversal unit to process a tensor, including determining memory address values for tensor elements of the tensor. Referring to FIG. 2B, a program 212 may be stored in the storage medium 104 or another storage medium that can be executed by the processing unit 102. The program 212 specifies a character array variable V having a first dimension of 4, a second dimension of 2, and a third dimension of 2. The program 212 specifies a nested for-loop for traversing the variable V, where the for-loop traverses the first dimension of V in an outer loop tracked by a nested loop index variable i; traverses the second dimension of V in a middle loop tracked by a nested loop index variable j; and traverses the third dimension of V in an inner loop tracked by a nested loop index variable k. Although the illustrated example of FIGS. 2B-2H described herein includes three dimensions, memory address values for tensors having different numbers of dimensions (e.g., 2, 5, 8, or some other number of dimensions) can be determined in a similar manner. For example, a tensor having eight dimensions may be traversed and the memory addresses for the tensor elements can be determined using an 8-deep loop nest.

In some implementations, the tensor address value elements 200 may be initialized at the beginning of a program. For example, a processor may execute an instruction "InitializeElements" that initializes the tensor address value elements 200. The instruction may be a hardware instruction of an instruction set executable by a processor. In some implementations, after initialization, each element of the tensor address value elements 200 is set to a predetermined value. In some implementations, the processor may execute a separate instruction for each group of tensor address value elements, e.g., one for the initial value elements 202, one for the step values, elements, and so on. Each separate instruction may set each element of its group to a predetermined value for that element.

In this example, each initial value element 202 is set to a value of zero. The initial value for a dimension is a value to which the partial address offset value for the dimension is set for a first iteration of the for-loop that traverses the dimension. Thus, in this example, the partial address offset value for each dimension will be set to a value of zero for the first iteration of the for-loop for the dimension.

The step value elements may store step values of partial address offsets used to determine a memory address for a tensor element. The step value for a dimension is a value that is added to the partial address offset value for the dimension after each iteration of the for-loop that traverses the dimension. In this example, the inner nested loop index variable k has a step value of 1, the middle nested loop index variable j has a step value of 6, and the outer nested loop index variable i has a step value of 2.

In some implementations, the processor, a user, or a compiler that compiles a program for traversing a tensor determines the step value and/or end value for each dimension based on a number of elements in one or more of the dimensions of the tensor. In this way, the memory addresses computed for each tensor element is different from the memory address for each other tensor element. In some implementations, the memory addresses are determined such that the sequence of elements accessed during the traversal are physically contiguous in memory. In this example, the first tensor element may be stored at a first memory location with a first address, the second tensor element may be stored at a second memory location directly next to the first memory location, the third tensor element may be stored at a third memory location directly next to the second memory location, and so on. In some implementations, the memory addresses are determined such that the sequence of elements accessed during the traversal are not physically contiguous in memory. In this example, the second tensor element may not be stored directly next to the first tensor element.

The end value elements may store end values for the dimensions. The end value for a dimension represents a value at which the partial address offset value is reset to the initial value for the dimension. In addition, when the partial address offset value of a first loop equals the end value for the first loop, the step value for a second loop in which the first loop is nested is added to the partial address offset value of the second loop. In this example, the inner nested loop index variable i has an end value of 2, the middle nested loop index variable i has a step value of 12, and the outer nested loop index variable k has an end value of 6. Thus, when the partial address offset value for the inner nested loop index variable i reaches a value of 2, the processor may reset the partial address offset value for the inner nested loop index variable i to zero and add the step value (6) for the middle nested loop index variable j to the partial address offset value for the middle nested loop index variable j. If this is the first iteration of the loop tracked by the middle nested loop index variable j, the partial address offset value for the middle nested loop index variable j would be 6 (0+6).

The partial address offset value elements 208 store partial address offset values for the dimensions. In this example, the processor set the partial address offset values to zero. The partial address offset values are used to determine a memory address offset for a tensor element. In some implementations, the memory address for a particular tensor element for a particular variable is based on a sum of a pre-specified base address for the tensor elements and the partial address offset values for dimensions of the tensor element, as shown in the equation 225. For variable V1, the memory address for a particular tensor element is equal to the sum of the base address for the tensor elements and the partial address offset values in row 208a (top row). Thus, for the tensor element corresponding to the first element of each dimension of variable V1 (i=0, j=0, k=0), the memory address is equal to the base address plus zero as the partial address offset values are all zero.

The memory address for the tensors elements can be determined using the hardware adder unit 124 of FIG. 1. For example, the input to an adder for a particular variable (e.g., variable V1) may be the base address and the values of each partial address offset value element in the row for the variable (e.g., row 208a for variable V1). The output is the memory address for the variable.

Figure 2C:
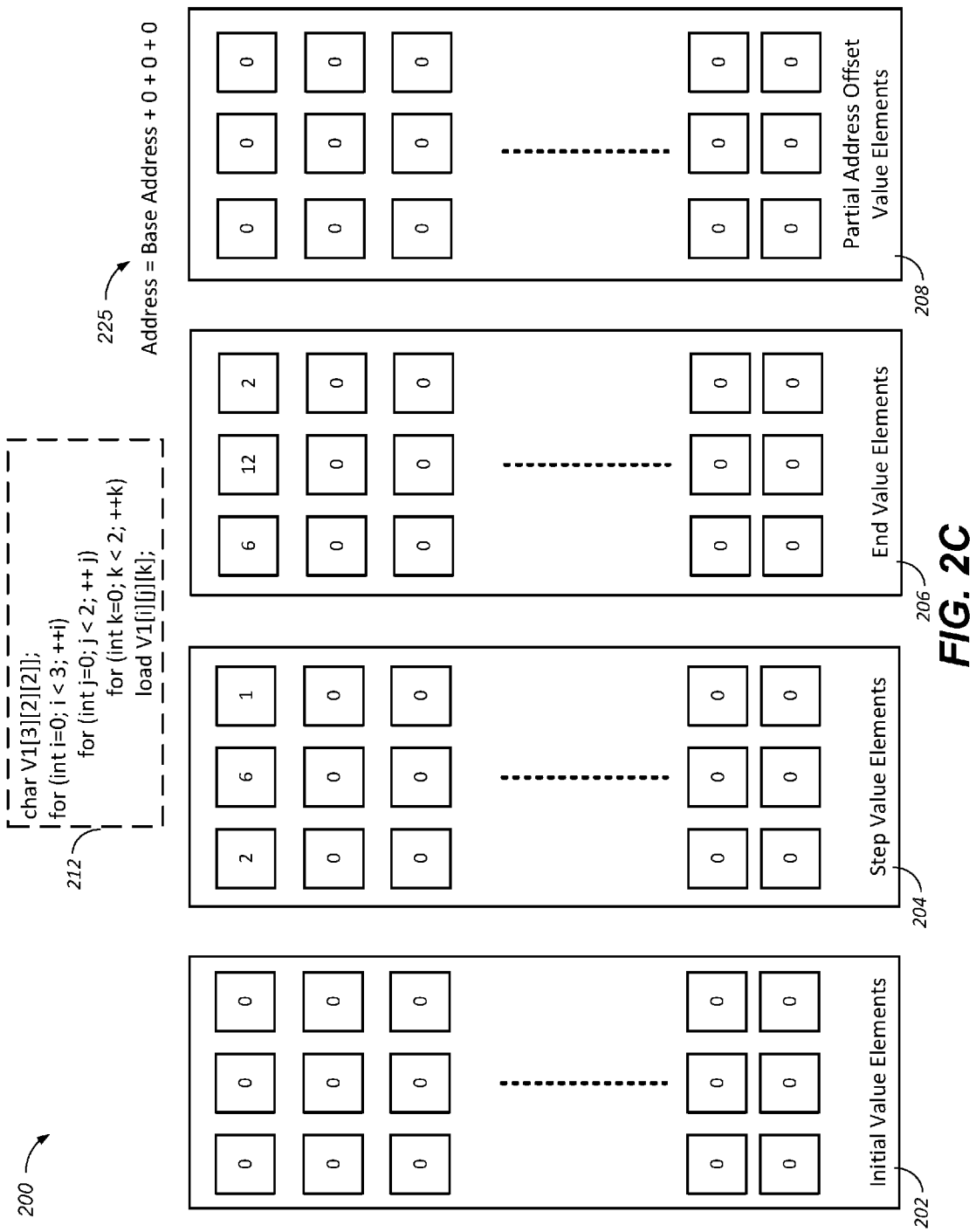

FIG. 2C illustrates accessing the element V1[0][0][0] according to the program 212. For example, the processor may execute an instruction "LocateTensor" that locates a memory address that corresponds to the element being accessed. In some implementations, the instruction may include a base memory address. For example, the instruction "Locate Tensor" may include a memory address of the element V1[0][0][0] that is the first element of the variable V1. In some implementations, the instruction may include a row number corresponding to a tensor to be accessed. For example, the instruction "LocateTensor" may include a row number corresponding to the variable V. Here, the row number is 1.

In some implementations, a computing system that includes the tensor traversal unit may include a finite-state machine (FSM) that queries memory address values from the tensor traversal unit. For example, the FSM may query the memory address values for the processor rather than the processor executing instructions such as the "LocateTensor" and "IterateTensor" instructions described with respect to FIGS. 2B-2H. The FSM may iteratively traverse the nested loops and iterate the partial address values while traversing the loops as described below with reference to the processor. The processor can then receive the determined memory address values from the hardware counter or from the FSM as they are determined.

In some implementations, in response to receiving the instruction, a hardware adder unit (e.g., the hardware adder unit 124 of FIG. 1) determines a memory address offset by calculating a sum of the values stored in each of the partial address offset value elements 208 in row 1 (row 208a) of the partial address value elements 208. Here, the hardware adder unit determines a sum of the values stored in elements $Z_{1,1}$, $Z_{1,2}$, and $Z_{1,3}$. The processor can then access the element V1[0][0][0] by adding the base memory address to the determined memory address offset (i.e., 0 in this example) to determine a memory address, and accessing the stored data in the storage medium based on the determined memory address. In another example, the hardware adder may determine the memory address for the element V1[0][0][0] by determining a sum of the base memory address and the values stored in elements $Z_{1,1}$, $Z_{1,2}$, and $Z_{1,3}$. The processor can then access the stored in the storage medium based on the determined memory address.

FIG. 2D illustrates accessing the element V1[0][0][1] according to the program 212. For example, after the program has completed the first iteration of the inner loop, the processor may execute an instruction "Iterate Tensor" that updates the partial address offset values as the program enters the second iteration of the inner loop (i.e., i=0, j=0, k=1). In some implementations, the tensor traversal unit updates partial address offset values by incrementing the partial address offset value element 208 for the dimension corresponding to the inner loop (the loop tracked by inner nested loop index variable i) by the step value for the dimension corresponding to the inner loop. In this example, the partial address offset value stored in partial address offset value element $Z_{1,1}$ is incremented by the step value stored in step value element $X_{1,1}$ using the hardware adder unit. The resulting updated partial address offset value stored for the inner loop is the sum of the previous value stored in $Z_{1,1}$ and the value stored in $X_{1,1}$, i.e., 0+1=1.

In some implementations, the tensor traversal unit compares the updated partial offset address value stored in element $Z_{1,1}$ to the end value for the inner loop stored in element $Y_{1,1}$. If the updated partial offset address value stored in $Z_{1,1}$ equals the end value for the inner loop stored in element $Y_{1,1}$, the tensor traversal unit may reset the value of the partial offset address value stored in element $Z_{1,1}$ to the initial value for the inner loop stored in element $V_{1,1}$. In addition, the tensor traversal unit may increment the partial address offset value for the dimension corresponding to the middle loop stored in element $Z_{1,2}$ by the step value for the middle loop stored in $X_{1,2}$, as described in more detail below.

If the updated partial offset address value stored in element $Z_{1,1}$ is less than the end value for the inner loop stored in element $Y_{1,1}$, the tensor traversal unit may keep the updated partial address value for the inner loop stored in element $Z_{1,1}$. In this example, the updated partial address offset value for the inner loop (1) is less than the end value for the inner loop (2). Thus, the tensor traversal unit keeps the updated partial address offset value stored in the partial address offset element $Z_{1,1}$ for the inner loop without incrementing the partial address offset value for the middle loop.

The processor can then access the element V1[0][0][1] by executing the instruction "Locate Tensor" to locate the memory address that corresponds to V1[0][0][1]. In response to receiving the instruction, the hardware adder unit determines a memory address offset by calculating a sum of the values stored in each of the partial address offset value elements 208 in row 1 (row 208a) of the partial address value elements 208. Here, the hardware adder unit determines a sum of the values stored in elements $Z_{1,1}$, $Z_{1,2}$, and $Z_{1,3}$. The processor can then access the element V1[0][0][1] by adding the base memory address to the determined memory address offset (i.e., 1 in this example) to determine a memory address, and accessing the stored data in the storage medium based on the determined memory address. In another example, the hardware adder may determine the memory address for the element V1[0][0][1] by determining a sum of the base memory address and the values stored in elements $Z_{1,1}$, $Z_{1,2}$, and $Z_{1,3}$. The processor can then access the stored in the storage medium based on the determined memory address.

FIG. 2E illustrates accessing the element V1[0][1][0] according to the program 212. For example, after the program has completed the second iteration of the inner loop, the processor may execute an instruction "Iterate Tensor" that updates the partial address offset values as the program enters the second iteration of the middle loop (i.e., i=0, j=1, k=0). In some implementations, the tensor traversal unit updates partial address offset values by incrementing the partial address offset value element 208 for the dimension corresponding to the inner loop (the loop tracked by inner nested loop index variable i) by the step value for the dimension corresponding to the inner loop. In this example, the partial address offset value stored in partial address offset value element $Z_{1,1}$ is incremented by the step value stored in step value element $X_{1,1}$ using the hardware adder unit. The resulting updated partial address offset value stored for the inner loop is the sum of the previous value stored in $Z_{1,1}$ and the value stored in i.e., 1+1=2.

In some implementations, the tensor traversal unit compares the updated partial offset address value stored in element $Z_{1,1}$ to the end value for the inner loop stored in element $Y_{1,1}$. If the updated partial offset address value stored in $Z_{1,1}$ equals the end value for the inner loop stored in element $Y_{1,1}$, the tensor traversal unit may reset the value of the partial offset address value stored in element $Z_{1,1}$ to the initial value for the inner loop stored in element $V_{1,1}$. In addition, the tensor traversal unit may increment the partial address offset value for the dimension corresponding to the middle loop stored in element $Z_{1,2}$ by the step value for the middle loop stored in $X_{1,2}$.

If the updated partial offset address value stored in element $Z_{1,1}$ is less than the end value for the inner loop stored in element $Y_{1,1}$, the tensor traversal unit may keep the updated partial address value for the inner loop stored in element $Z_{1,1}$. In this example, the updated partial address offset value for the inner loop (2) equals the end value for the inner loop (2). Thus, the tensor traversal unit resets the partial offset address value stored in element $Z_{1,1}$ to the initial value stored in element $V_{1,1}$. In addition, the tensor traversal unit increments the partial address offset value for the middle loop stored in element $Z_{1,2}$ by the step value for the middle loop stored in $X_{1,2}$. In this example, the updated partial address offset value for the middle loop is 6 (0+6).

In some implementations, the tensor traversal unit compares the updated partial offset address value for the middle loop stored in element $Z_{1,2}$ to the end value for the middle loop stored in element $Y_{1,2}$ in response to determining the updating the partial offset address value for the middle loop. If the updated partial offset address for the middle loop value stored in $Z_{1,2}$ equals the end value for the middle loop stored in element $Y_{1,2}$, the tensor traversal unit may reset the value of the partial offset address value stored in element $Z_{1,2}$ to the initial value for the middle loop stored in element $V_{1,2}$. In addition, the tensor traversal unit may increment the partial address offset value for the dimension corresponding to the outer loop stored in element $Z_{1,3}$ by the step value for the outer loop stored in $X_{1,3}$, as described below.

If the updated partial offset address value for the middle loop stored in element 42 is less than the end value for the middle loop stored in element $Y_{1,2}$, the tensor traversal unit may keep the updated partial address value for the middle loop stored in element $Z_{1,2}$. In this example, the updated partial address offset value for the middle loop (6) is less than the end value for the inner loop (12). Thus, the tensor traversal unit keeps the updated partial address offset value stored in the partial address offset element $Z_{1,2}$ for the middle loop without incrementing the partial address offset value for the outer loop.

The processor can then access the element V1[0][1][0] by executing the instruction "Locate Tensor" to locate the memory address that corresponds to V1[0][1][0]. In response to receiving the instruction, the hardware adder unit determines a memory address offset by calculating a sum of the values stored in each of the partial address offset value elements 208 in row 1 (row 208a) of the partial address value elements 208. Here, the hardware adder unit determines a sum of the values stored in elements $Z_{1,1}$, $Z_{1,2}$, and $Z_{1,3}$. The processor can then access the element V1[0][1][0] by adding the base memory address to the determined memory address offset (i.e., 6 in this example) to determine a memory address, and accessing the stored data in the storage medium based on the determined memory address. In another example, the hardware adder may determine the memory address for the element V1[0][1][0] by determining a sum of the base memory address and the values stored in elements $Z_{1,1}$, $Z_{1,2}$, and $Z_{1,3}$. The processor can then access the stored in the storage medium based on the determined memory address.

Figure 2F:
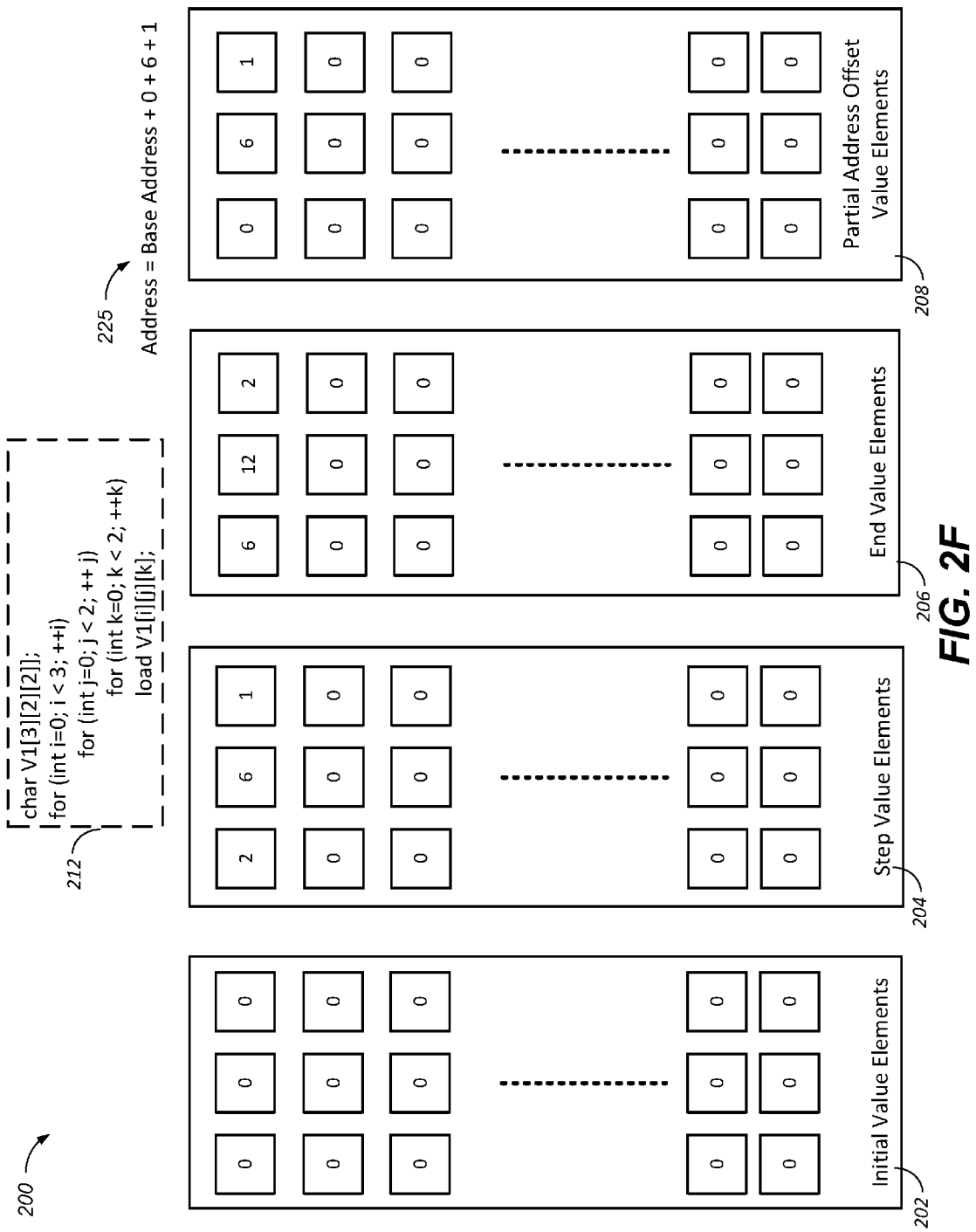

FIG. 2F illustrates accessing the element V1[0][1][1] according to the program 212. For example, after the program has completed the first iteration of the inner loop for the second iteration of the middle loop, the processor may execute an instruction "Iterate Tensor" that updates the partial address offset values as the program enters the second iteration of the inner loop for the second iteration of the middle loop (i.e., i=0, j=1, k=1). In some implementations, the tensor traversal unit updates partial address offset values by incrementing the partial address offset value element 208 for the dimension corresponding to the inner loop (the loop tracked by inner nested loop index variable i) by the step value for the dimension corresponding to the inner loop. In this example, the partial address offset value stored in partial address offset value element $Z_{1,1}$ is incremented by the step value stored in step value element $X_{1,1}$ using the hardware adder unit. The resulting updated partial address offset value stored for the inner loop is the sum of the previous value stored in $Z_{1,1}$ and the value stored in i.e., 0+1=2.

In some implementations, the tensor traversal unit compares the updated partial offset address value stored in element $Z_{1,1}$ to the end value for the inner loop stored in element $Y_{1,1}$. If the updated partial offset address value stored in $Z_{1,1}$ equals the end value for the inner loop stored in element $Y_{1,1}$, the tensor traversal unit may reset the value of the partial offset address value stored in element $Z_{1,1}$ to the initial value for the inner loop stored in element $V_{1,1}$. In addition, the tensor traversal unit may increment the partial address offset value for the dimension corresponding to the middle loop stored in element $Z_{1,2}$ by the step value for the middle loop stored in $X_{1,2}$.

If the updated partial offset address value stored in element $Z_{1,1}$ is less than the end value for the inner loop stored in element $Y_{1,1}$, the tensor traversal unit may keep the updated partial address value for the inner loop stored in element $Z_{1,1}$. In this example, the updated partial address offset value for the inner loop (1) is less than the end value for the inner loop (2). Thus, the tensor traversal unit keeps the updated partial address offset value stored in the partial address offset element $Z_{1,1}$ for the inner loop without incrementing the partial address offset value for the middle loop.

The processor can then access the element V1[0][1][1] by executing the instruction "Locate Tensor" to locate the memory address that corresponds to V1[0][1][1]. In response to receiving the instruction, the hardware adder unit determines a memory address offset by calculating a sum of the values stored in each of the partial address offset value elements 208 in row 1 (row 208a) of the partial address value elements 208. Here, the hardware adder unit determines a sum of the values stored in elements $Z_{1,1}$, $Z_{1,2}$, and $Z_{1,3}$. The processor can then access the element V1[0][1][1] by adding the base memory address to the determined memory address offset (i.e., 7 in this example) to determine a memory address, and accessing the stored data in the storage medium based on the determined memory address. In another example, the hardware adder may determine the memory address for the element V1[0][1][1] by determining a sum of the base memory address and the values stored in elements $Z_{1,1}$, $Z_{1,2}$, and $Z_{1,3}$. The processor can then access the stored in the storage medium based on the determined memory address.

Figure 2G:
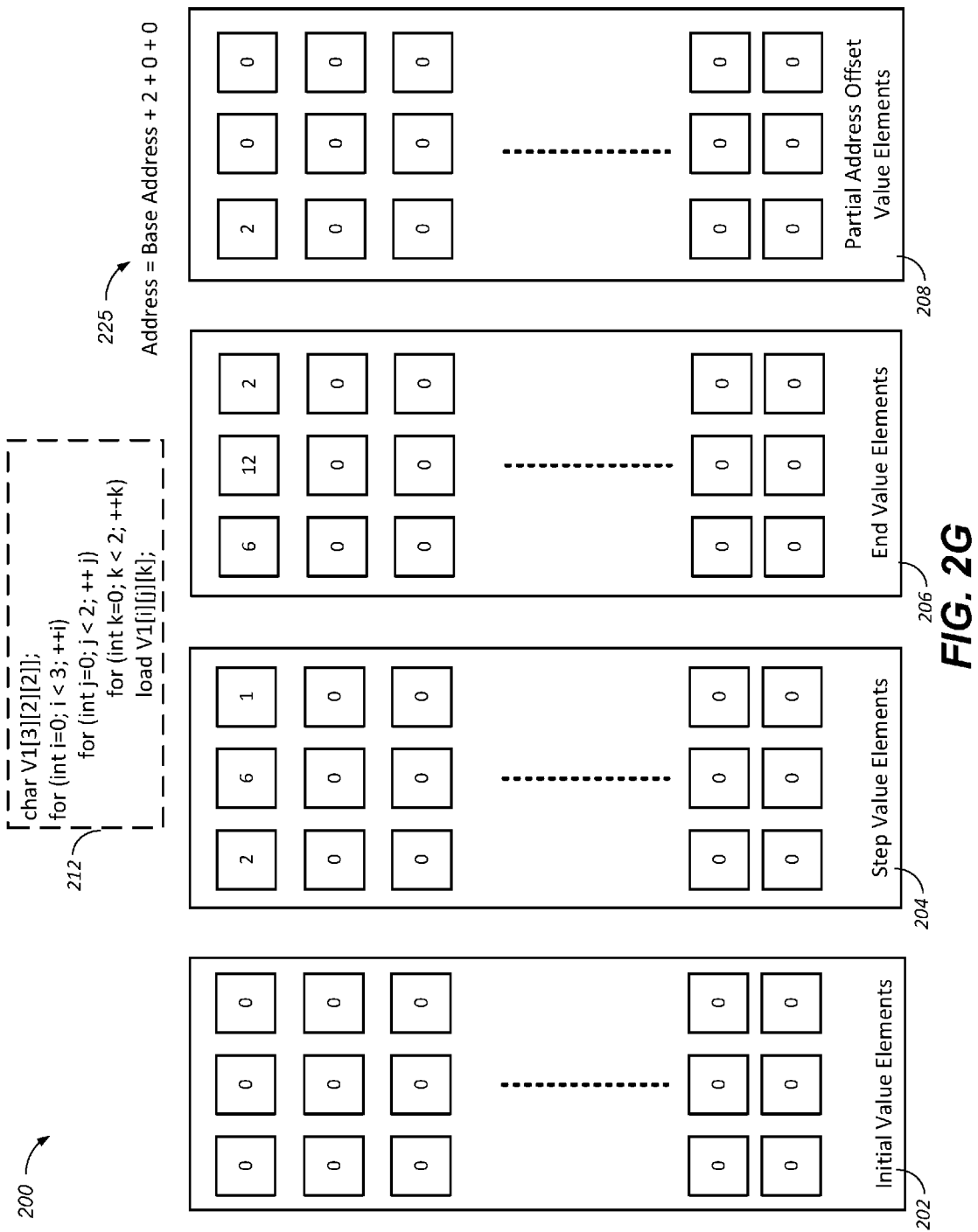

FIG. 2G illustrates accessing the element V1[1][0][0] according to the program 212. For example, after the program has completed the second iteration of the inner loop for the second iteration of the middle loop, the processor may execute an instruction "Iterate Tensor" that updates the partial address offset values as the program enters the second iteration of the outer loop (i.e., i=1, j=0, k=0). In some implementations, the tensor traversal unit updates partial address offset values by incrementing the partial address offset value element 208 for the dimension corresponding to the inner loop (the loop tracked by inner nested loop index variable i) by the step value for the dimension corresponding to the inner loop. In this example, the partial address offset value stored in partial address offset value element $Z_{1,1}$ is incremented by the step value stored in step value element $X_{1,1}$ using the hardware adder unit. The resulting updated partial address offset value stored for the inner loop is the sum of the previous value stored in $Z_{1,1}$ and the value stored in $X_{1,1}$, i.e., 1+1=2.

In some implementations, the tensor traversal unit compares the updated partial offset address value stored in element $Z_{1,1}$ to the end value for the inner loop stored in element $Y_{1,1}$. If the updated partial offset address value stored in $Z_{1,1}$ equals the end value for the inner loop stored in element $Y_{1,1}$, the tensor traversal unit may reset the value of the partial offset address value stored in element $Z_{1,1}$ to the initial value for the inner loop stored in element $V_{1,1}$. In addition, the tensor traversal unit may increment the partial address offset value for the dimension corresponding to the middle loop stored in element $Z_{1,2}$ by the step value for the middle loop stored in $X_{1,2}$.

If the updated partial offset address value stored in element $Z_{1,1}$ is less than the end value for the inner loop stored in element $Y_{1,1}$, the tensor traversal unit may keep the updated partial address value for the inner loop stored in element $Z_{1,1}$. In this example, the updated partial address offset value for the inner loop (2) equals the end value for the inner loop (2). Thus, the tensor traversal unit resets the partial offset address value stored in element $Z_{1,1}$ to the initial value stored in element $V_{1,1}$. In addition, the tensor traversal unit increments the partial address offset value for the middle loop stored in element $Z_{1,2}$ by the step value for the middle loop stored in $X_{1,2}$. In this example, the updated partial address offset value for the middle loop is 12 (6+6).

In some implementations, the tensor traversal unit compares the updated partial offset address value for the middle loop stored in element $Z_{1,2}$ to the end value for the middle loop stored in element $Y_{1,2}$ in response to determining the updating the partial offset address value for the middle loop. If the updated partial offset address for the middle loop value stored in $Z_{1,2}$ equals the end value for the middle loop stored in element $Y_{1,2}$, the tensor traversal unit may reset the value of the partial offset address value stored in element $Z_{1,2}$ to the initial value for the middle loop stored in element $V_{1,2}$. In addition, the tensor traversal unit may increment the partial address offset value for the dimension corresponding to the outer loop stored in element $Z_{1,3}$ by the step value for the outer loop stored in $X_{1,3}$.

If the updated partial offset address value for the middle loop stored in element $Z_{1,2}$ is less than the end value for the middle loop stored in element $Y_{1,2}$, the tensor traversal unit may keep the updated partial address value for the middle loop stored in element $Z_{1,2}$. In this example, the updated partial address offset value for the middle loop (12) equals the end value for the middle loop (12). Thus, the tensor traversal unit resets the partial offset address value stored in element $Z_{1,2}$ to the initial value stored in element $V_{1,2}$. In addition, the tensor traversal unit increments the partial address offset value for the outer loop stored in element $Z_{1,3}$ by the step value for the outer loop stored in $X_{1,3}$. In this example, the updated partial address offset value for the outer loop is 2 (0+2).

The processor can then access the element V1[1][0][0] by executing the instruction "Locate Tensor" to locate the memory address that corresponds to V1[1][0][0]. In response to receiving the instruction, the hardware adder unit determines a memory address offset by calculating a sum of the values stored in each of the partial address offset value elements 208 in row 1 (row 208a) of the partial address value elements 208. Here, the hardware adder unit determines a sum of the values stored in elements $Z_{1,1}$, $Z_{1,2}$, and $Z_{1,3}$. The processor can then access the element V1[1][0][0] by adding the base memory address to the determined memory address offset (i.e., 2 in this example) to determine a memory address, and accessing the stored data in the storage medium based on the determined memory address. In another example, the hardware adder may determine the memory address for the element V1[1][0][0] by determining a sum of the base memory address and the values stored in elements $Z_{1,1}$, $Z_{1,2}$, and $Z_{1,3}$. The processor can then access the stored in the storage medium based on the determined memory address.

FIG. 2H illustrates accessing the element V1[1][0][1] according to the program 212. For example, after the program has completed the first iteration of the inner loop for the second iteration of the outer loop, the processor may execute an instruction "Iterate Tensor" that updates the partial address offset values as the program enters the second iteration of the inner loop for the second iteration of the outer loop (i.e., i=1, j=0, k=1). In some implementations, the tensor traversal unit updates partial address offset values by incrementing the partial address offset value element 208 for the dimension corresponding to the inner loop (the loop tracked by inner nested loop index variable i) by the step value for the dimension corresponding to the inner loop. In this example, the partial address offset value stored in partial address offset value element $Z_{1,1}$ is incremented by the step value stored in step value element $X_{1,1}$ using the hardware adder unit. The resulting updated partial address offset value stored for the inner loop is the sum of the previous value stored in $Z_{1,1}$ and the value stored in $X_{1,1}$, i.e., 0+1=2.

In some implementations, the tensor traversal unit compares the updated partial offset address value stored in element $Z_{1,1}$ to the end value for the inner loop stored in element $Y_{1,1}$. If the updated partial offset address value stored in $Z_{1,1}$ equals the end value for the inner loop stored in element $Y_{1,1}$, the tensor traversal unit may reset the value of the partial offset address value stored in element $Z_{1,1}$ to the initial value for the inner loop stored in element $V_{1,1}$. In addition, the tensor traversal unit may increment the partial address offset value for the dimension corresponding to the middle loop stored in element $Z_{1,2}$ by the step value for the middle loop stored in $X_{1,2}$.

If the updated partial offset address value stored in element $Z_{1,1}$ is less than the end value for the inner loop stored in element $Y_{1,1}$, the tensor traversal unit may keep the updated partial address value for the inner loop stored in element $Z_{1,1}$. In this example, the updated partial address offset value for the inner loop (1) is less than the end value for the inner loop (2). Thus, the tensor traversal unit keeps the updated partial address offset value stored in the partial address offset element $Z_{1,1}$ for the inner loop without incrementing the partial address offset value for the middle loop.

The processor can then access the element V1[1][0][1] by executing the instruction "Locate Tensor" to locate the memory address that corresponds to V1[1][0][1]. In response to receiving the instruction, the hardware adder unit determines a memory address offset by calculating a sum of the values stored in each of the partial address offset value elements 208 in row 1 (row 208a) of the partial address value elements 208. Here, the hardware adder unit determines a sum of the values stored in elements $Z_{1,1}$, $Z_{1,2}$, and $Z_{1,3}$. The processor can then access the element V1[1][0][1] by adding the base memory address to the determined memory address offset (i.e., 3 in this example) to determine a memory address, and accessing the stored data in the storage medium based on the determined memory address. In another example, the hardware adder may determine the memory address for the element V1[1][0][1] by determining a sum of the base memory address and the values stored in elements $Z_{1,1}$, $Z_{1,2}$, and $Z_{1,3}$. The processor can then access the stored in the storage medium based on the determined memory address.

The tensor traversal unit can continue determining memory addresses for remaining iterations of the nested loops to access the remaining tensor elements in a similar manner. Table 1 below shows the memory address offset values for the tensor elements using the step values illustrated in FIGS. 2A-2H.

TABLE 1

| Tensor Element | Memory Address Offset Value |
| --- | --- |
| (i = 0, j = 0, k = 0) | 0 |
| (i = 0, j = 0, k = 1) | 1 |
| (i = 0, j = 1, k = 0) | 6 |
| (i = 0, j = 1, k = 1) | 7 |
| (i = 1, j = 0, k = 0) | 2 |
| (i = 1, j = 0, k = 1) | 3 |
| (i = 1, j = 1, k = 0) | 8 |
| (i = 1, j = 1, k = 1) | 9 |

TABLE 1-continued

| Tensor Element | Memory Address Offset Value |
|---|---|
| (i = 2, j = 0, k = 0) | 4 |
| (i = 2, j = 0, k = 1) | 5 |
| (i = 2, j = 1, k = 0) | 10 |
| (i = 2, j = 1, k = 1) | 11 |

Figure 3:
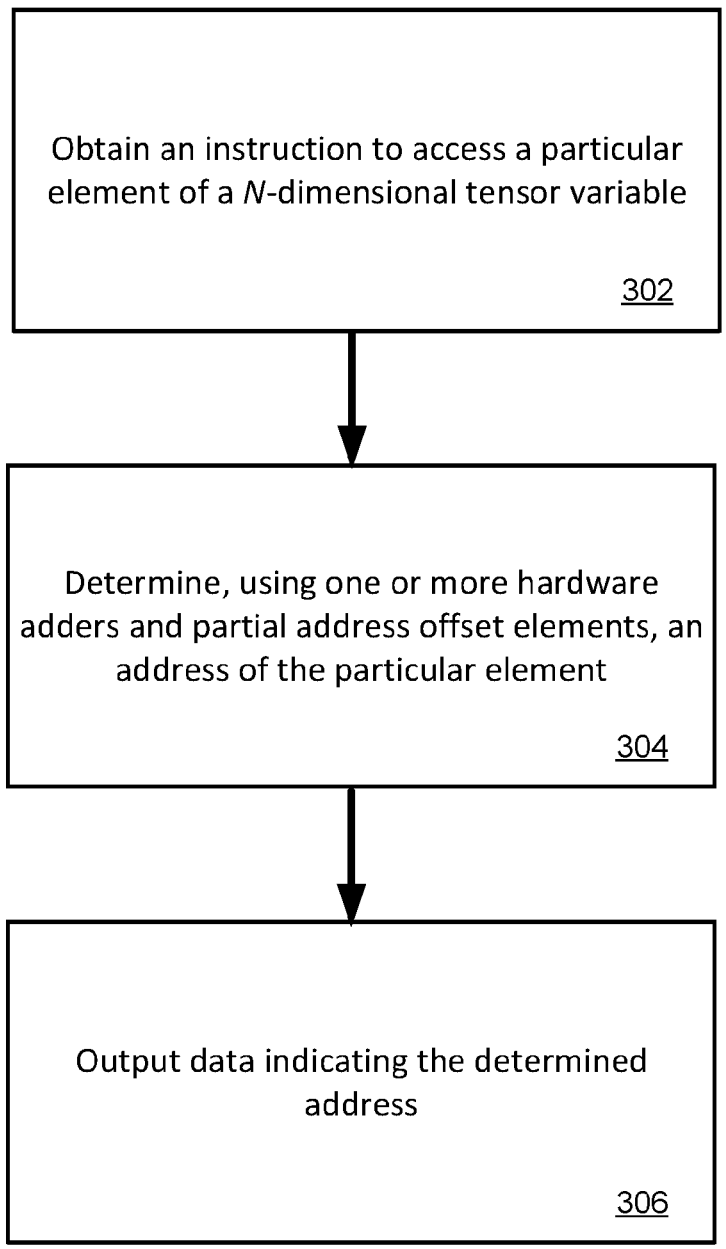
FIG. 3 is a flow diagram that illustrates an example process for determining an address of a multi-dimensional tensor variable.

FIG. 3 is a flow diagram that illustrates an example process 300 for determining an address of a multi-dimensional tensor variable. The process 300 may be performed by a system of one or more computers, e.g., the computing system 100 of FIG. 1. The system includes a tensor traversal unit having tensor address value elements including initial value elements, step value elements, end value elements, and partial address offset elements. The tensor traversal unit also includes a hardware adder unit having one or more hardware adders.

The system obtains an instruction to access a particular element of a N-dimensional tensor (302). The N-dimensional tensor can include multiple elements arranged across each of the N dimensions, where N is an integer that is equal to or greater than one. For example, the system may include a processing unit (e.g., the processing unit 102) that executes an instruction for accessing a particular element of a tensor.

In some implementations, the instruction may represent an instruction for processing a nested loop that includes a first loop, a second loop, and a third loop. The first loop may be an inner loop nested within the second loop and the second loop may be a middle loop nested within the third loop. The first loop may be iterated using a first index variable. Similarly, the second loop may be iterated using a second index variable and the third loop may be iterated using a third index variable. For example, a program may be stored in a storage medium that can be executed by the processing unit. The program may specify a character array variable V (or another type of array) a first dimension of 2, a second dimension of 2, and a third dimension of 3. The program may specify a nested for-loop for traversing the variable V. The for-loop may traverse the third dimension of V in an outer loop tracked by a nested loop index variable i. The for-loop may also traverse the second dimension of V in a middle loop tracked by a nested loop index variable j and traverse the first dimension in an inner loop tracked by the nested loop index variable k.

The system determines, using one or more hardware adders and partial address offset elements, an address of the particular element (304). In some implementations, the address of the particular element may be an address offset from another element of the N-dimensional tensor. For example, the address of the particular element may be an address offset from a base memory address of another element of the N-dimensional tensor. For each tensor index element of the one or more tensor index elements, the system may determine the memory address by adding the current values of the partial address offset elements together with the base memory address using the hardware adder(s). The current values of the partial address offset elements are based on the current iteration of the loops.

In some implementations, prior to determining the address offsets for any of the elements of the tensor, the system may set values stored in the tensor address value elements. For example, a processor may execute an instruction "InitializeElements" that initializes the tensor address value elements.

For each iteration of the inner loop, the system may update the partial address offset value for the inner loop using the step value for the inner loop. Before the first iteration of the inner loop for the first iterations of the middle and outer loop (i.e., i=0, j=0, k=0), the partial address offset value for the inner loop may be set to the initial value for the inner loop.

After each iteration of the inner loop, the system may update the partial address offset value for the inner loop to the sum of the previous partial address offset value for the inner loop and the step value for the inner loop. The system may then compare the updated partial address offset value for the inner loop to the end value for the inner loop. If the updated partial address offset value for the inner loop is less than the end value for the inner loop, the system may maintain the updated partial address offset value for the inner loop in its partial address offset value element without modifying any of the other partial address offset values at least until the next iteration of the inner loop.

If this updated partial address offset value is equal to the end value for the inner loop, the system may reset the partial address offset value to the initial value for the inner loop and increment the partial address offset value for the middle loop using the step value for the inner loop. For example, the system may update the partial address offset value for the middle loop to the sum of the previous partial address offset value for the middle loop and the step value for the middle loop. The system may then compare the updated partial address offset value for the middle loop to the end value for the middle loop. If the updated partial address offset value for the middle loop is less than the end value for the inner loop, the system may maintain the updated partial address offset value for the middle loop in its partial address offset value element without modifying any of the other partial address offset values at least until the next iteration of the middle loop.

If this updated partial address offset value is equal to the end value for the middle loop, the system may reset the partial address offset value to the initial value for the middle loop and increment the partial address offset value for the outer loop using the step value for the outer loop. For example, the system may update the partial address offset value for the outer loop to the sum of the previous partial address offset value for the outer loop and the step value for the outer loop. The system may then compare the updated partial address offset value for the outer loop to the end value for the outer loop.

If the updated partial address offset value for the outer loop is less than the end value for the outer loop, the system may maintain the updated partial address offset value for the outer loop in its partial address offset value element. If this updated partial address offset value is equal to the end value for the outer loop, the system may reset the partial address offset values for each loop to their respective initial value as each element of the tensor has been accessed.

The system outputs data indicating the determined address for accessing the particular element of the N-dimensional tensor (306). For example, the tensor traversal unit may output the determined address based on a sum of the current partial address offset values and the base memory address. The processing unit of the system may access, using a memory address offset value, a particular element of an N-dimensional array variable in the storage medium.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory program carrier for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array), an ASIC (application specific integrated circuit), or a GPGPU (General purpose graphics processing unit).

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. An apparatus for processing an instruction for accessing an N-dimensional tensor, the apparatus comprising:

for each dimension of the N-dimensional tensor, a partial address offset value element that stores a partial address offset value for the dimension, the partial address offset value for each dimension being based at least on an initial value for the dimension, a step value for the dimension, and a number of iterations of a loop for the dimension, wherein each partial address offset value element comprises hardware storage circuitry;

one or more hardware adders; and one or more hardware processors configured to execute one or more instructions of an instruction set executable by the one or more hardware processors, wherein execution of the one or more instructions causes the one or more hardware processors to perform operations comprising:

obtain an instruction to access a particular element of the N-dimensional tensor, wherein the N-dimensional tensor has multiple elements arranged across each of the N dimensions, and wherein N is an integer that is equal to or greater than two;

obtain, for each dimension of the N-dimensional tensor, a current partial address offset value for the dimension from the partial address offset value element for the dimension;

determine, using the one or more hardware adders, a memory address of the particular element, including determining, using the one or more hardware adders, a sum of the obtained current partial address offset values, the determined memory address of the particular element being different from a value of the particular element stored at the determined memory address of the particular element;

output data indicating the determined address for accessing the particular element of the N-dimensional tensor; and update the partial address offset value for at least one of the dimensions by adding, using the one or more hardware adders, the step value for the at least one dimension to the current partial address offset value for the at least one dimension.

2. The apparatus of claim 1, further comprising for each dimension:
an initial value element that stores the initial value for the dimension; and
a step value element that stores the step value for the dimension.

3. The apparatus of claim 2, wherein each partial address offset value element, each initial value element, and each step value element comprises a hardware register.

4. The apparatus of claim 1, wherein the one or more hardware processors are further configured to:
determine, for each dimension, the partial address offset value for the dimension after each iteration of a nested loop for the dimension by adding the step value to a previous partial address offset value for the dimension.

5. The apparatus of claim 4, further comprising, for each dimension, a limit value element that stores a limit value for the dimension, wherein the one or more hardware processors are further configured to:
determine, for each dimension, whether the determined partial address offset value for the dimension equals the limit value for the dimension; and
in response to determining that the determined partial address offset value for a first dimension that corresponds to a first nested loop equals the limit value for the first dimension:
resetting the partial address offset value for the first dimension to the initial value for the first dimension; and
updating, for a second dimension that corresponds to a second nested loop in which the first nested loop is nested and using the one or more hardware adders, the partial address offset value for the second dimension to equal a sum of the step value for the second dimension and the partial address offset value for the second dimension.

6. The apparatus of claim 1, wherein the step value for each dimension is a predetermined value based on a number of elements in one or more of the dimensions.

7. The apparatus of claim 1, wherein:
the one or more processors determine a respective memory address for each element of the N-dimensional tensor in a sequence based on the loops for the dimensions; and
the one or more processors update the partial address offset value for each dimension after an iteration of the loop for the dimension by:
adding the step value for the dimension to a current partial address value for the dimension; and
determining whether the updated partial address offset value for the dimension is equal to an end value for the dimension;
when the updated partial address offset value for the dimension equals the end value for the dimension, updating the partial address offset value for the dimension to equal the initial value for the dimension; and
when the updated partial address offset value for the dimension does not equal the end value for the dimension, storing the updated partial address offset value for the dimension in the updated partial address offset value element for the dimension.

8. A system comprising:
one or more processing units configured to perform linear algebra operations on an N-dimensional tensor, wherein the N-dimensional tensor has multiple elements arranged across each of the N dimensions, and wherein N is an integer that is equal to or greater than two;
for each dimension of the N dimensions, a partial address offset value element that stores a partial address offset value for the dimension, the partial address offset value for each dimension being based at least on an initial value for the dimension, a step value for the dimension, and a number of iterations of a loop for the dimension, wherein each partial address offset value element comprises hardware storage circuitry;
circuitry that includes:
one or more hardware adders; and
one or more hardware processors that are configured to:
obtain an instruction to access a particular element of the N-dimensional tensor;
obtain, for each dimension of the N-dimensional tensor, a current partial address offset value for the dimension from the partial address offset value element for the dimension;
determine, using the one or more hardware adders, a memory address of the particular element, including determining, using the one or more hardware adders, a sum of the obtained current partial address offset values, the determined memory address of the particular element being different from a value of the particular element stored at the determined memory address of the particular element;
output data indicating the determined memory address for accessing the particular element of the N-dimensional tensor; and
update the partial address offset value for at least one of the dimensions by adding, using the one or more hardware adders, the step value for the at least one dimension to the current partial address offset value for the at least one dimension.

9. The system of claim 8, further comprising for each dimension:
an initial value element that stores the initial value for the dimension; and
a step value element that stores the step value for the dimension.

10. The system of claim 9, wherein each partial address offset value element, each initial value element, and each step value element comprises a hardware register.

11. The system of claim 8, wherein the one or more processors are further configured to:
determine, for each dimension, the partial address offset value for the dimension after each iteration of a nested loop for the dimension by adding the step value to a previous partial address offset value for the dimension.

12. The system of claim 11, further comprising, for each dimension, a limit value element that stores a limit value for the dimension, wherein the one or more processors are further configured to:
determine, for each dimension, whether the determined partial address offset value for the dimension equals the limit value for the dimension; and
in response to determining that the determined partial address offset value for a first dimension that corresponds to a first nested loop equals the limit value for the first dimension:

resetting the partial address offset value for the first dimension to the initial value for the first dimension; and updating, for a second dimension that corresponds to a second nested loop in which the first nested loop is nested and using the one or more hardware adders, the partial address offset value for the second dimension to equal a sum of the step value for the second dimension and the partial address offset value for the second dimension.

13. The system of claim 8, wherein the step value for each dimension is a predetermined value based on a number of elements in one or more of the dimensions.

14. The system of claim 8, wherein:
the one or more processors determine a respective memory address for each element of the N-dimensional tensor in a sequence based on the loops for the dimensions; and
the one or more processors update the partial address offset value for each dimension after an iteration of the loop for the dimension by:
adding the step value for the dimension to a current partial address value for the dimension; and
determining whether the updated partial address offset value for the dimension is equal to an end value for the dimension;
when the updated partial address offset value for the dimension equals the end value for the dimension, updating the partial address offset value for the dimension to equal the initial value for the dimension; and
when the updated partial address offset value for the dimension does not equal the end value for the dimension, storing the updated partial address offset value for the dimension in the updated partial address offset value element for the dimension.

15. A computer-implemented method, comprising:
obtaining, by one or more hardware processors, an instruction to access a particular element of an N-dimensional tensor, wherein the N-dimensional tensor has multiple elements arranged across each of the N dimensions, and wherein N is an integer that is equal to or greater than two and wherein each partial address offset value element comprises hardware storage circuitry;
determining, by the one or more hardware processors and using partial address offset values stored in respective partial address offset elements and one or more hardware adders, a memory address of the particular element, wherein the partial address values include a partial address offset value for each dimension and wherein the partial address value for a dimension is based at least on an initial value for the dimension, a step value for the dimension, and a number of iterations of a loop for the dimension, the determining comprising:
obtaining, for each dimension of the N-dimensional tensor, a current partial address offset value for the dimension from the partial address offset value elements for the dimension; and
determining, using the one or more hardware adders, a sum of the obtained current partial address offset values, the determined memory address of the particular element being different from a value of the particular element stored at the determined memory address of the particular element;

outputting, by the one or more hardware processors, data indicating the determined memory address for accessing the particular element of the N-dimensional tensor; and updating, the partial address offset value for at least one of the dimensions by adding, using the one or more hardware adders, the step value for the at least one dimension to the current partial address offset value for the at least one dimension.

16. The method of claim 15, wherein:
the initial value for each dimension is stored in an initial value element for the dimension; and
the step value for the dimension is stored in a step value element for the dimension.

17. The method of claim 16, wherein each partial address offset value element, each initial value element, and each step value element comprises a hardware register.

18. The method of claim 15, further comprising:
determining, for each dimension, the partial address offset value for the dimension after each iteration of a nested loop for the dimension by adding the step value to a previous partial address offset value for the dimension.

19. The method of claim 18, further comprising:
determining, for each dimension, whether the determined partial address offset value for the dimension equals a limit value for the dimension; and
in response to determining that the determined partial address offset value for a first dimension that corresponds to a first nested loop equals the limit value for the first dimension:
resetting the partial address offset value for the first dimension to the initial value for the first dimension; and
updating, for a second dimension that corresponds to a second nested loop in which the first nested loop is nested and using the one or more hardware adders, the partial address offset value for the second dimension to equal a sum of the step value for the second dimension and the partial address offset value for the second dimension.

20. The method of claim 15, wherein:
the one or more processors determine a respective memory address for each element of the N-dimensional tensor in a sequence based on the loops for the dimensions; and
the one or more processors update the partial address offset value for each dimension after an iteration of the loop for the dimension by:
adding the step value for the dimension to a current partial address value for the dimension; and
determining whether the updated partial address offset value for the dimension is equal to an end value for the dimension;
when the updated partial address offset value for the dimension equals the end value for the dimension, updating the partial address offset value for the dimension to equal the initial value for the dimension; and
when the updated partial address offset value for the dimension does not equal the end value for the dimension, storing the updated partial address offset value for the dimension in the updated partial address offset value element for the dimension.

* * * * *